Patented May 21, 1929.

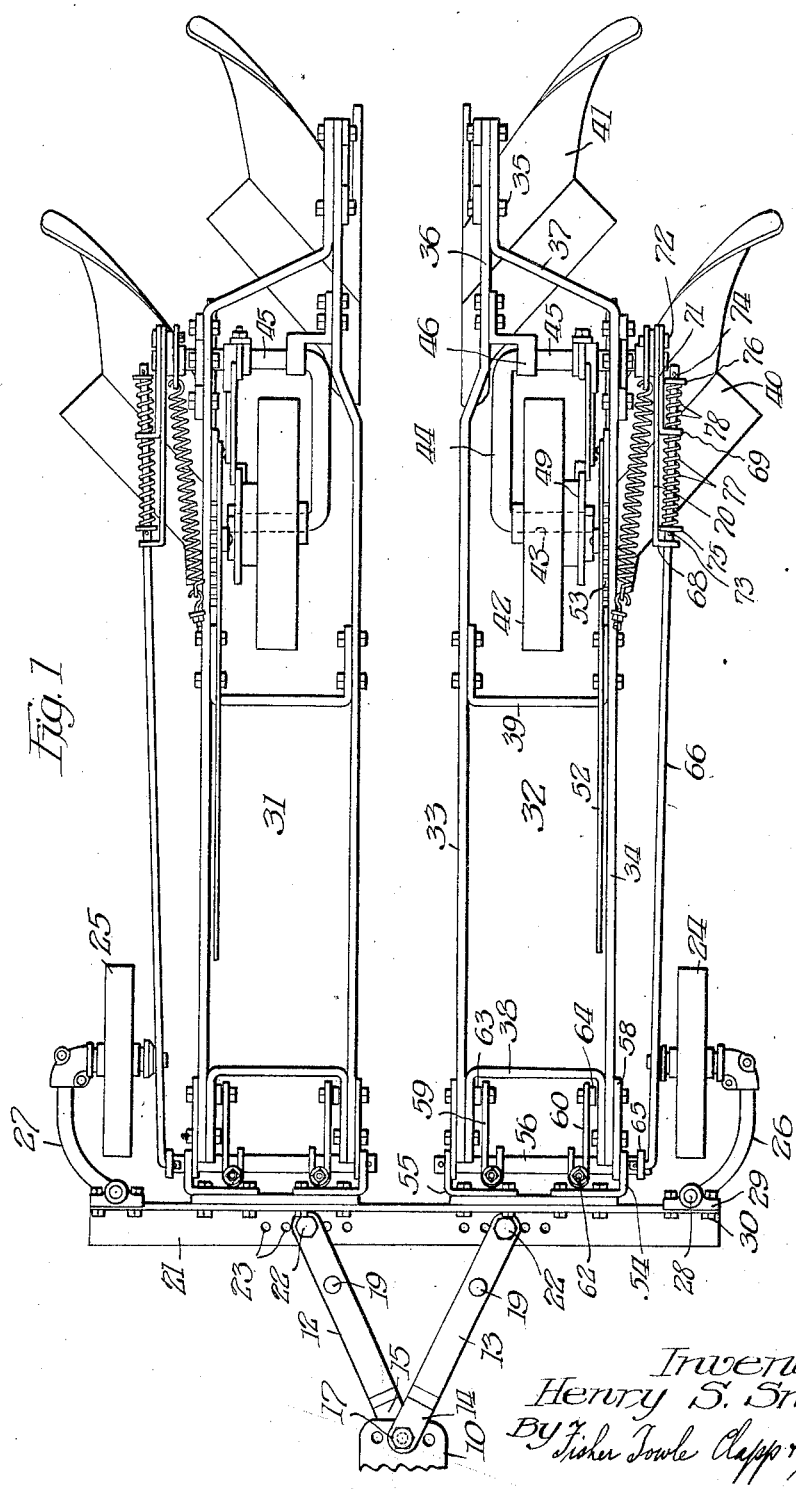

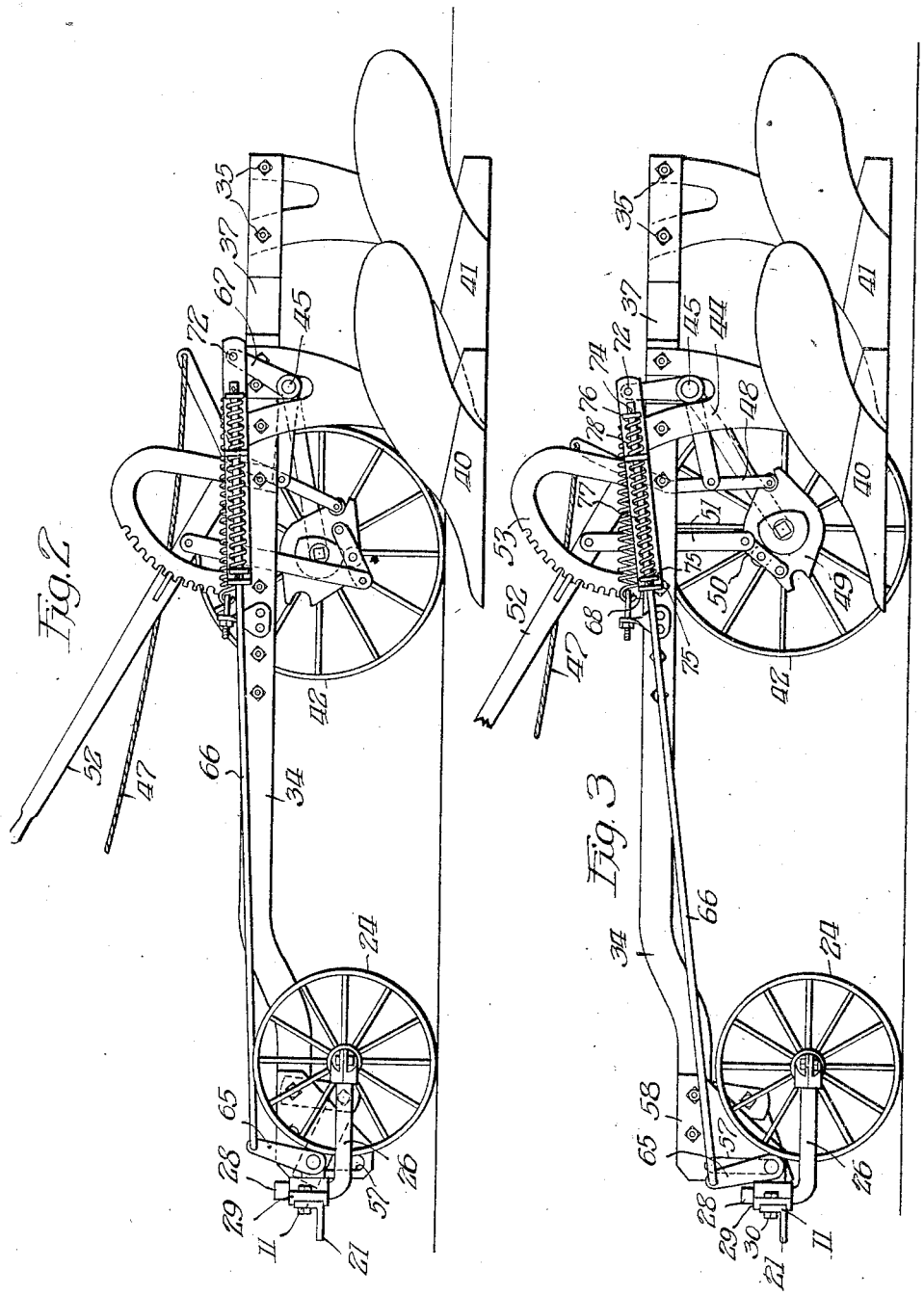

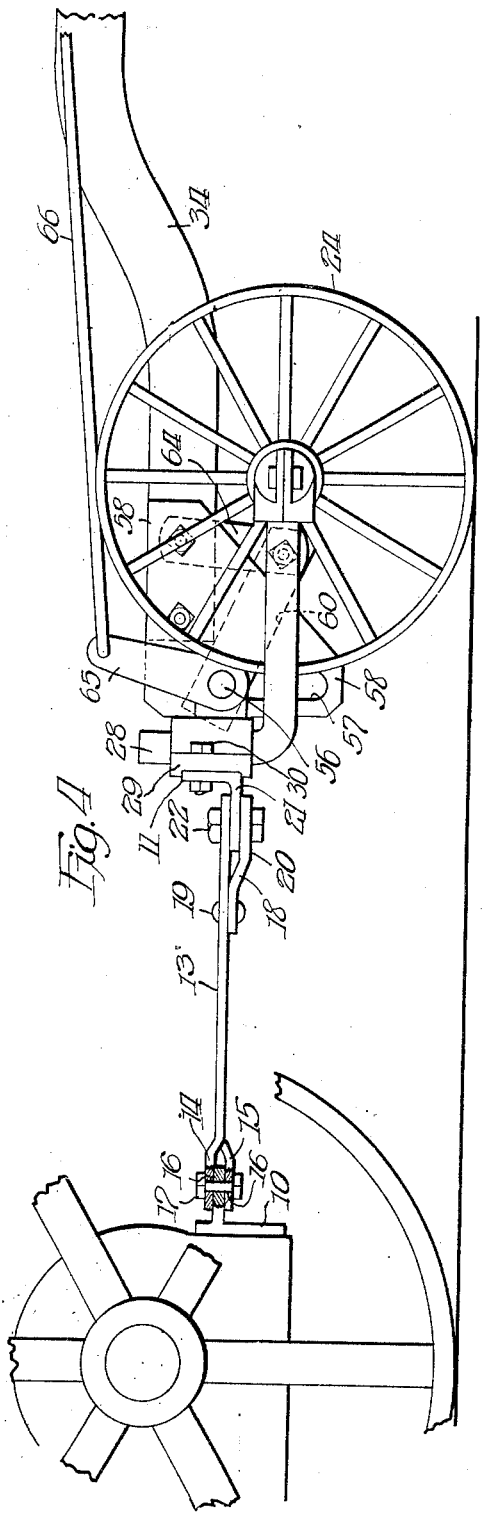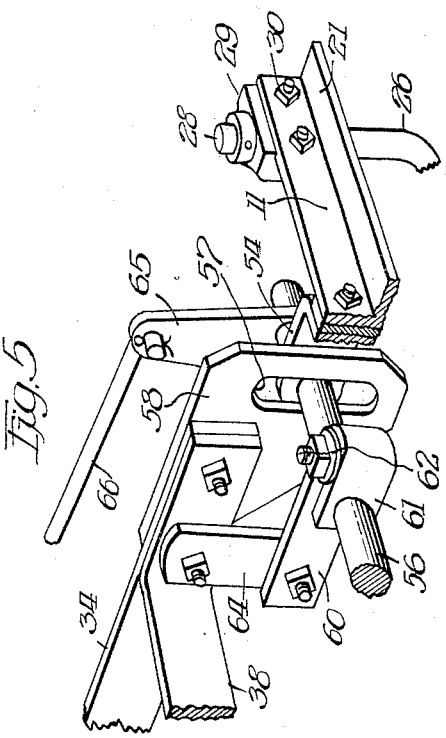

1,713,928

UNITED STATES PATENT OFFICE.

HENRY S. SMITH, OF DIXON, ILLINOIS, ASSIGNOR TO J. I. CASE THRESHING MACHINE COMPANY, OF RACINE, WISCONSIN, A CORPORATION OF WISCONSIN.

TWO-WAY POWER LIFT PLOW.

Application filed July 24, 1922. Serial No. 577,004.

My invention relates to improvement in two-way power lift plows, and has particular reference to a plow of such type which is, or may be, equipped with a plurality of bottoms and is adapted to be drawn by mechanical power, such as a tractor.

The principal object of the invention is to provide a power lift plow provided with means whereby the implement may be arranged for right-hand or left-hand operation; that is to say, so that it will produce a right-hand or a left-hand furrow at will. Further objects of the invention are to provide an improved arrangement of implement construction whereby a beam or other structure to which the earth-turning body or bodies are secured may be equipped with a single ground wheel; to provide a construction of the class described in which improved means are employed for the purpose of maintaining the plow beam frame transversely horizontal; that is to say, to prevent twisting of same around an axis corresponding with the line of draft; to provide an improved power lift structure; to provide means whereby the front end of the plow beam may be elevated as well as the rear end, thereby maintaining the bottoms substantially horizontal and preventing accumulations of thrash while avoiding the necessity of unduly elevating the bottoms when the same are not in plowing position; to provide an improved construction whereby the plow frame is prevented from swinging laterally with reference to the draft member; to provide an improved construction in which the gauge wheel or supporting wheel for the plow beam is located relatively close to the draft member, thereby making for ease in handling, and in general to provide an improved plow construction of the character referred to.

In the drawings which illustrate my invention as applied to a double bottom, two-way power lift tractor plow:—

Fig. 1 is a plan view of the plow so equipped.

Fig. 2 is a side elevation of the plow shown in Fig. 1, only one of the beams and associated parts being shown, in this instance with the bottoms in operative or depressed position.

Fig. 3 is a view similar to Fig. 2 but showing the beam and plow bottoms elevated from the ground or in an inoperative position.

Fig. 4 is a fragmentary elevation, showing the details of the hitch connection between the tractor and the front draft frame of the implement, and Fig. 5 is an enlarged perspective view of a portion of the connections between the draft frame and the front end of one of the beam frames.

Referring to the drawings, the numeral 10 represents the bar or link forming a part of the tractor which is employed for hauling the plow, it being understood that said bar 10 is maintained at a substantially constant elevation as it forms a permanent part of the tractor. Said link 10 constitutes a draft connection and also a front support for the draft frame which may be considered to include the transverse or extending horizontal angle iron 11 and the draft links 12 and 13. The draft links 12 and 13 are vertically offset at their front ends in different directions, as shown at 14 and 15, and are perforated, as shown at 16, the front ends of the links being brought together so as to bring their apertures 16 in registration with a corresponding aperture in the draft member 10 to which they are connected by means of a suitable pin or bolt 17. The rear ends of said draft links 12 and 13 are each provided with a small underlying strap member 18 riveted to the link at its front end, as at 19, and offset, as shown at 20, to form a bifurcation embracing the horizontal flange 21 of the angle iron draft bar 11. Suitable pins or bolts, as at 22, connect the bifurcated rear ends of the draft links 12 and 13 with the draft member 11, a series of spaced apertures 23 in the flange 21 enabling the draft links 12 and 13 to be adjusted in any desired position making for maximum efficiency.

By reason of the comparatively close fit of the flange 21 of the angle iron draft frame member 11 between the bifurcated rear ends of the draft links 12 and 13, said draft links 12 and 13 constitute, in effect, substantially rigid front extensions of the angle iron member 11, which is prevented from swinging downwardly by the front wheels 24 and 25 of the plow structure.

Said supporting wheels 24 and 25, which are spaced widely apart to accommodate the pair of beam structures between them and also in order to maintain the draft frame transversely horizontal, are connected to the ends of the angle iron draft member 11 by means of axles 26 and 27. As shown best in Fig. 1, the said axles 26 and 27 have horizontal journals on which the supporting wheels 24 and 25 rotate freely and are oppositely curved in order to bring the front ends of said axles directly in front of the respective supporting wheels. The actual connection between the axles 26 and 27 and the angle iron draft frame 11 is effected by bending upwardly the front ends of the axles, as shown at 28, which upwardly extending end 28 is secured in split clamping members 29 of usual construction and bolted to the vertical flange of the angle iron 11, as at 30. Said clamp members 29 also serve to permit vertical adjustment of the angle iron draft member 11 with reference to the supporting wheels 24 and 25 whenever there is any occasion for such change in height.

In view of the fact that the two plow beam frames 31 and 32 and associated parts are identical, with the exception that one is made for a left-hand furrow and the other is made for a right-hand furrow, it will be necessary to describe in detail only one of said structures. As shown, the structure 32 comprises a pair of longitudinally and substantially horizontally extending bars or beams 33 and 34 connected together at their rear ends by means of bolts 35 extending through the offset extensions 36 and 37 of said beams, the front and intermediate portions of said beams being connected by means of transversely extending U-shaped tie-members 38 and 39 bolted between the parallel portions of said beam parts 33 and 34. The front or outer bottom 40 is secured to the outer plow beam 34, while the rear or trailing bottom 41 is secured to the inner beam part 33. If desired, in place of only two bottoms, an additional plow may be employed or, in certain cases, the front bottom 40 may be removed and a larger bottom installed in place of the trailing bottom 41. The ground wheel 42 which acts as a gauge wheel for the bottoms and also supports the rear portion of the beam frame structure, is preferably located in advance or in the path of the trailing bottom 41 and intermediate the points of the two bottoms in the event that the plow is equipped with two bottoms, as shown.

As I am not claiming in this application the specific details of the power lift mechanism, it is unnecessary for me to specifically describe such parts. In order to secure an understanding of such specific mechanism reference may be had to my co-pending application, Serial No. 553,710, filed April 17, 1922. I prefer to employ such mechanism in view of its advantages and general efficiency, but it will be manifest to those skilled in the art, that any other improved type of power mechanism operated from the ground wheel 42 may be employed to effect automatic elevation and depression of the bottoms at the will of the operator.

In this application it will be sufficient to state that the ground wheel 42 is journaled to rotate freely on the horizontal portion 43 of the crank axle 44, the upper portion of which is reversely bent, as shown at 45, to constitute a horizontally extending, transverse shaft portion rocking in bearings 46 bolted to the beam structure. By means of a hand line 47 and clutch trip lever 48 controlled thereby, the operator is enabled through suitable clutch mechanism not shown, to effect a partial but definite rotary movement of plate 49 which, through links 50 and 51, serves to rock the crank axle 44 in its bearings, thus raising or lowering the plow beam relative to the ground wheel 42. Regulation of the depth or height to which the bottoms are lowered is effected by a hand lever 52 co-operating with a fixed quadrant and to which the upper end of the link 51 is pivotally connected.

An important feature of my invention consists in the means whereby the front end of the plow beam structures or frames may be vertically adjusted; that is to say, raised or lowered a suitable distance according to the raising or lowering of the rear ends of the beam frames to which the bottoms are connected, such vertical adjustment of the front ends of the beams being effected by, and as an incident to, the operation of the main power lift mechanism which controls the raising or lowering of the bottoms. Such mechanism will now be described.

As shown best in Figs. 1 and 5, there is secured to the vertical flange of the angle iron draft member 11 a pair of angular brackets 54 and 55, the ends of which are bent rearwardly and apertured to provide bearings for a horizontal, transversely extending shaft 56. Such shaft 56 also serves as the actual draft connection between the frame 11 and the front ends of beams 33 and 34 by reason of its extending through a pair of vertically extending slots, as at 57, punched in the front ends of a pair of substantially triangular plates 58 respectively bolted to the front ends of the beams 33 and 34. It will be understood that by reason of the fit of shaft 56 in slots 57, the beam structure 32 is prevented from developing any substantial swinging movement in a horizontal plane and, hence, the relative position of the ground wheel 42 and the tail end of the beam structure will always be substantially maintained with reference to the ends of the draft frame 11 and the front supporting wheels 24 and 25.

The vertical movement of the front ends of the beam members 33 and 34 with respect to the constant height at which the shaft 56 is maintained, is accomplished by a pair of similar arms or levers 59 and 60 spaced along and keyed to the shaft 56. In the present instance, each of said arms comprises a flat bar having its front end bent or folded, and being perforated at said folded end to admit the shaft 56. The clamping of said arm on said shaft 56 is effected by means of a wedge bolt 62, or any other suitable means may be employed to key the arms 59 and 60 on said shaft.

The arms 59 and 60 are spaced apart along the shaft 56 as widely as practicable (as shown at 61) so as to facilitate connection of their rear ends with the lower ends of a pair of links 63 and 64, the upper ends of which links 63 and 64 are respectively pivotally connected to the front ends of the plow beams 33 and 34. It will be apparent that the rotary position of the shaft 56 will control the vertical position of the ends of the beams through arms 59 and 60, and also that the front ends of beams 33 and 34 will be compelled to rise and fall in unison, thereby preventing twisting of the beam structure around an axis corresponding with the line of draft. The position of said shaft 56 is controlled by means of an arm or upstanding lever 65 which, in conjunction, with the arms 59 and 60, constitutes in effect a bell crank connection between the draft frame 11 and the front end of the beam structure. Manifestly, when the arm 65 is rocked and with it shaft 56, the arms 59 and 60 will rock upwardly and carry with them the front ends of the beam members 33 and 34. The rocking of the lever 65 is effected by a rod 66 which is actuated by the power lift mechanism.

The power lift mechanism operates the rod 66 through an arm 67 keyed to the horizontal portion 45 of the axle 44. It will be observed that the arm 67 is not directly connected to the rod 66, as said rod is arranged to slide through apertures drilled in a pair of lugs 68 and 69 formed from the bent ends of a pair of flat bars 70 and 71, the rear ends of which are directly connected to a pin 72 on the end of said arm 67. The rear end of the said actuating rod 66 is drilled to accommodate a pair of fixed pins 73 and 74 acting as stop members for a pair of washers or collars 75 and 76, against which collars press the respective outer ends of a pair of coil compression springs 77 and 78. The inner ends of the said springs 77 and 78 act against the interposed lug 69 of the bar 71.

The effect of the resilient connection between the rod 66 and the pin 72 is to impart a certain amount of flexibility to the operation of the rod 66 in controlling the elevation of the front end of the plow beam structure, thereby enabling the same to accommodate itself to irregularities in the surface of the ground which is being operated upon.

It will be observed that in the absence of an idler or caster wheel for supporting the tail end of the plow beams, and because of the comparatively short distance between the supporting wheels 24 and 25 and the main gauge wheel 42, the handling of the plow, as a whole, is considerably improved, which is an important factor in a two-way plow, for the reason that such plows are ordinarily used on side hills where it is necessary to turn the plow completely around at the end of each furrow before starting to plow in the reverse direction.

By reason of the fact that the power lifting arrangement for each half of the combined plow is operated by its own ground wheel and separate control connections, the dropping or raising of the right-hand and the left-hand sections may be effected independently. Ordinarily, of course, when in operation one set of plows will be depressed and the other set will be raised, and when turning the plow at the end of the furrow, both sets of plows will be elevated.

The described details of construction and operation being illustrative of a single phase of my invention, it will be understood that the scope of the same should be determined by reference to the appended claims, said claims being construed as broadly as possible consistent with the state of the art.

I do not claim herein subject matter disclosed in any prior pending application owned by my assignee.

I claim as my invention:

1. In combination, a plow beam, a draft member provided with an idler wheel for maintaining said draft member at a substantially constant height, a bell crank pivotally mounted on said draft member and having an arm connecting said draft member with the front end of said beam, a plow body at the rear end of said beam, a ground wheel for supporting the rear end of said beam adjacent said plow body, power lift mechanism actuated by the rotation of said ground wheel for effecting vertical movement of the plow beam relative to said ground wheel, and a yielding connection from said lift mechanism and extending to the other arm of said bell crank for effecting vertical movement of the front end of said beam relative to said draft member upon operation of said power lift mechanism.

2. In a two-way power lift plow, the combination of a front draft frame maintained at a substantially constant height, a right-hand and a left-hand plow beam independently connected at their front ends to said draft frame, a pair of ground wheels for respectively supporting the rear ends of said beams, a main power lift mechanism associated with and actuated by each of said ground wheels for lifting the rear end of the beams supported thereby and tending to swing same upwardly around the front end of said beam as a pivot, and auxiliary means actuated by said power lift mechanism for effecting vertical movement of the front end of said beam relative to said draft frame for maintaining said beam substantially horizontal.

3. In a two-way power lift plow, the combination of a front draft frame maintained at a substantially constant height, a right-hand and a left-hand plow beam independently connected at their front ends to said draft frame, a pair of ground wheels for respectively supporting the rear ends of said beams, a main power lift mechanism associated with and actuated by each of said ground wheels for lifting the rear end of the beams supported thereby and tending to swing same upwardly around the front end of said beam as a pivot, and auxiliary means actuated by said power lift mechanism for effecting vertical movement of the front end of said beam relative to said draft frame for maintaining said beam substantially horizontal, the power lift mechanism associated with each wheel being capable of independent operation.

4. In a power lift plow, the combination of a front draft frame provided with a pair of laterally spaced ground wheels, a pair of plow beams, one right-hand and the other left-hand, each of said plow beams comprising laterally spaced members having vertically adjustable draft connection with said draft frame, the front end of each of said spaced members being controlled in its vertical movement relative to said front frame, a plow secured to the end of each of said plow beams, a single ground wheel for supporting the rear end of each of said beams, and power lift mechanism for effecting vertical movement of each plow beam relative to its ground wheel and actuated by said ground wheel.

5. In a power lift plow, the combination of a front draft frame provided with a pair of laterally spaced ground wheels for maintaining said frame at a substantially constant height, a pair of plow beams, one right-hand and the other left-hand, each of said plow beams comprising laterally spaced members having vertically adjustable draft connection with said draft frame, the front end of each of said spaced members being controlled in its vertical movement relative to said front frame, a plow secured to the end of each of said plow beams, a single ground wheel for supporting the rear end of each of said beams, and a power lift mechanism for effecting vertical movement of each of said plow beams relative to its ground wheel and actuated by said ground wheel, the arrangement including means operated by said lift mechanism for effecting vertical movement of the front end of each of said plow beams relative to said front frame whereby said plow beam is maintained substantially horizontal in its elevated and depressed positions.

6. In an agricultural implement, the combination of a front draft frame maintained at a substantially uniform elevation and substantially horizontal transversely of the line of draft, a plow beam frame having secured thereto a pair of bottoms, one leading the other, a single supporting wheel for said beam frame located in the path of the trailing bottom, and means connecting the front end of said beam frame with the draft frame, for maintaining said beam frame transversely horizontal, while permitting vertical adjustment at will between the front end of said beam frame and said draft frame, the arrangement including means for lifting the plows from the ground by power derived from said wheel, said last named means also controlling the vertical adjustment of the front end of said beam frame.

7. In a plow, the combination with a wheel supported frame, of a plowing unit, lifting means connected with said unit and operable to raise or lower the rear portion thereof, a draft member mounted on said frame, the front end portion of said unit being connected with said draft member for vertical adjustment relatively thereto, means mounted on said frame movable to raise or lower the front end of said unit relatively to said draft member, and means actuated by the lifting of the rear portion of said unit for moving the latter means to raise the front end portion of said unit.

8. In a plow, the combination with a wheel supported frame, of a plowing unit ground wheel supported lifting means connected with said unit and operable to raise or lower the rear portion thereof, a draft member mounted on said frame, the front end portion of said unit being connected with said draft member for vertical adjustment relatively thereto, means mounted on said frame movable to raise or lower the front end of said unit relatively to said draft member, and means actuated by the lifting of the rear portion of said unit for moving the latter means to raise the front end portion of said unit.

HENRY S. SMITH.